(12) United States Patent
Matsunaga et al.

(10) Patent No.: US 7,372,887 B2
(45) Date of Patent: May 13, 2008

(54) EXCIMER LASER DEVICE, LASER GAS EXCHANGE METHOD AND PARTIAL GAS EXCHANGE QUANTITY CALCULATION METHOD

(75) Inventors: Takashi Matsunaga, Tochigi (JP); Toru Abe, Tochigi (JP)

(73) Assignees: Komatsu Ltd., Tokyo (JP); Ushio Inc., Tokyo (JP)

( * ) Notice: Subject to any disclaimer, the term of this patent is extended or adjusted under 35 U.S.C. 154(b) by 75 days.

(21) Appl. No.: 11/406,903

(22) Filed: Apr. 19, 2006

(65) Prior Publication Data
US 2006/0239322 A1   Oct. 26, 2006

(30) Foreign Application Priority Data
Apr. 20, 2005   (JP) ............... 2005-122501

(51) Int. Cl.
    H01S 3/22   (2006.01)
(52) U.S. Cl. ............ 372/59; 372/55; 372/57; 372/58
(58) Field of Classification Search ........ 372/57–60
    See application file for complete search history.

(56) References Cited

U.S. PATENT DOCUMENTS

| | | | |
|---|---|---|---|
| 4,977,573 A * | 12/1990 | Bittenson et al. ........ 372/81 |
| 5,090,020 A * | 2/1992 | Bedwell ................ 372/59 |
| 5,450,436 A * | 9/1995 | Mizoguchi et al. ...... 372/59 |
| 6,028,880 A * | 2/2000 | Carlesi et al. ......... 372/58 |
| 6,151,349 A * | 11/2000 | Gong et al. ........... 372/58 |
| 6,151,350 A * | 11/2000 | Komori et al. ......... 372/59 |
| 6,496,527 B1 * | 12/2002 | Terashima et al. ...... 372/60 |
| 7,006,548 B1 * | 2/2006 | Terashima et al. ...... 372/60 |

FOREIGN PATENT DOCUMENTS

JP      2701184      4/1993

\* cited by examiner

*Primary Examiner*—Minsun Oh Harvey
*Assistant Examiner*—Phillip Nguyen
(74) *Attorney, Agent, or Firm*—Welsh & Katz, Ltd.

(57) ABSTRACT

To provide an excimer laser device and method in which the frequency of full gas exchange within the laser chamber is reduced, and more preferably full gas exchange is made unnecessary.

The gas supply device and gas exhaust device are controlled so that the laser gas in the laser chamber is partially exchanged in a gas exchange quantity that maintains the quantity of impurities in the laser chamber at or below a fixed level. Also, the gas exchange quantity is obtained using the total quantity of output light energy reduction A, the total gas pressure in the laser chamber P, and output light energy reduction quantity per unit time k, for the case where partial gas exchange is repeated infinitely in the laser chamber.

5 Claims, 3 Drawing Sheets

EXCIMER LASER DEVICE, LASER GAS EXCHANGE METHOD AND PARTIAL GAS EXCHANGE QUANTITY CALCULATION METHOD

BACKGROUND OF THE INVENTION

1. Field of the Invention

The present invention relates to an excimer laser device and method in which the frequency of full gas exchange within the laser chamber is reduced, and more preferably full gas exchange is made unnecessary.

2. Description of the Related Art

Deterioration of Laser Gas and Countermeasures Against It

In excimer laser devices, a mixture of halogen gas, noble gas, and buffer gas is enclosed within the laser chamber for generating laser oscillations. As the excimer laser device is operated, the halogen gas enclosed in the laser chamber is consumed, and the reduction in halogen gas causes the output light energy of the excimer laser to reduce. In the following, explanations are provided as examples for a KrF excimer laser and an ArF excimer laser, which use fluorine gas as the halogen gas.

The main reason for the reduction in fluorine gas is parts within the laser chamber in contact with the fluorine gas reacting with the fluorine gas to form fluorides. Also, besides reduction in fluorine gas due to the generation of these fluorides, the output light energy is reduced by various impurities (oxygen and water) from the outside atmosphere passing the O-ring and becoming mixed with the laser gas.

Hence conventionally Japanese Patent No. 2701184 has disclosed technology to prevent the reduction of output light energy. The following is a summary of the method. As the laser device is operated, when the measured value of laser output light energy falls below a target value, the charging voltage value of a condenser is increased. The charging voltage value is gradually increased, and when it reaches a predetermined upper limit value, the laser chamber is replenished with a small amount of new gas. Then a part of the laser gas, corresponding to the amount of the pressure rise due to replenishment, is exhausted. Gas exchanging by replenishing with a small amount of gas in the laser chamber and then discharging part of the gas is called "partial gas exchange". The timing of partial gas exchange can be based upon parameters other than the charging voltage value (for example, the Japanese Patent No. 2701184 refers to the number of laser pulse oscillations).

Replenishing with a small amount of new gas replenishes the reduction in fluorine gas due to generation of fluorides, and restores the original partial pressure of fluorine gas. Also, discharging part of the laser gas exhausts part of the fluorides and impurities that entered the laser chamber from outside. In addition, the total gas pressure in the laser chamber is restored to the original total gas pressure. In other words, by partial gas exchange the concentration of impurities in the laser chamber is reduced, and the laser output light energy is increased (restored) corresponding to the amount by which the concentration of impurities is reduced. Therefore, it is possible to continue operating the excimer laser device while maintaining the output light energy at the required level and the charging voltage value within the appropriate range.

Laser Gas Control Device

FIG. 1 shows the configuration of the device that controls the replenishment of laser gas as described above. Laser gas is enclosed within a laser chamber 1. An ArF excimer laser is shown in the figure, so the laser gas is a mixture of fluorine gas, Ar gas, and Ne gas. If the partial pressure ratio (molar concentration ratio:unit %) of fluorine gas, Ar gas, and Ne gas is a:b:c, the partial pressure ratio a:b:c is for example 0.1:3.5:96.4. Also, to stabilize operation of the laser about 10 ppm of Xe gas is also sometimes added.

The power supply 2 includes mainly a charger, a condenser, and a magnetic compression circuit. The power supply 2 provides a pulsed high voltage between exhaust electrodes, which are not shown in the drawings, in the laser chamber 1. The laser gas between the electrodes generates light due to electrical exhaust when dielectric breakdown voltage is reached, and laser oscillations start. In accordance with the laser oscillations, output laser light 6 is emitted from the laser chamber 1.

The various operation parameters of the laser (total gas pressure within the laser chamber 1, output light energy, oscillation frequency, etc.) are input to a controller 3, which controls the laser based upon these values. The controller 3 outputs the charging voltage value of the charger to the power supply 2 as the instruction value.

The total gas pressure in the laser chamber 1 is measured by a pressure monitor 4, and the output light energy is measured by an output monitor 5. Each measured value is transmitted to the controller 3.

A first gas supply source 7 and a second gas supply source 8 are cylinders filled with laser gas to be supplied to the laser chamber 1. The partial pressure ratio of the gas within the first gas supply source 7 is F2:Ar:Ne=n×a:b:c (n>1). The partial pressure ratio of the gas within the second gas supply source 8 is Ar:Ne=b:c. The gas supply sources 7, 8 and the laser chamber 1 are connected by gas piping 10, 12, and valves 9, 11 are provided on the piping 10, 12. Also, the laser chamber 1 and an exhaust pump 13 are connected by a gas piping 14, and a valve 15 is provided on the piping 14.

The controller 3 controls the opening and closing of valves 9, 11 to carry out partial gas exchange. In a partial gas exchange, first a prescribed amount of laser gas is supplied to the laser chamber 1 from the gas supply sources 7, 8. Then laser gas corresponding to the amount by which the gas pressure has risen due to the replenishment is exhausted from the laser chamber 1 using the exhaust pump 13.

Example of Control of Partial Gas Exchange

FIG. 2 shows an example of partial gas exchange control flow. First, output light energy target value Et, the optimum control charging voltage range Vmin to Vmax (minimum value to maximum value), the threshold value Np of the pulse oscillation number N (timing frequency of carrying out partial gas exchange), and the amount of gas exchanged in one partial gas exchange process ΔG are input (Step S1). The optimum control charging voltage is the voltage range for which the output light energy variation is small and laser operation is stable. The optimum control charging voltage range is determined from tests.

Laser oscillation is started using the initial charging voltage Vinit (>Vmin), and for each pulse the output light energy E, the charging voltage instruction value V, and the pulse oscillation number N is measured (Step S2). The pulse oscillation number N is reckoned from when the laser gas is totally exchanged or from when latest partial gas exchange is carried out. In other words, when the laser gas is exchanged, N is cleared and the count starts again from one.

Also, the output light energy measured value E is compared with the output light energy target value Et (Step S3). If E<Et, the charging voltage value used for the next pulse oscillation is increased so that the output light energy E approaches the target value Et. In other words, to the charging voltage in the previous pulse oscillation VN a prescribed voltage value ΔV=g×(Et−E) corresponding to the energy difference (Et−E) is added, and this value is used as the charging voltage VN+1 in the next pulse oscillation (Step S4). Here g is a proportional constant. If E≈Et, then VN+1=VN (Step S5). If E>Et the charging voltage value used in the next pulse oscillation is reduced so that the output light energy approaches the target value Et. In other words, to the charging voltage in the previous pulse oscillation VN a prescribed voltage value ΔV2=g×(E−Et) corresponding to the energy difference (E−Et) is subtracted, and this value is used as the charging voltage VN+1 in the next pulse oscillation (Step S6). Also, the charging voltage VN+1 is compared with the charging voltage upper limit value Vmax (Step S10), and if VN+1<Vmax the procedure returns to Step S2 and a similar process is repeated. When VN+1≧Vmax the excimer laser device stops operating (Step S11). Thereafter all the gas in the laser chamber is exchanged, for example.

In parallel with the output light energy control in Steps S3 to S6, Step S10 and Step S11, the measured pulse oscillation number N is compared with the threshold value Np (Step S7). If N<Np, the procedure returns to Step S2 and a similar control is repeated. If N=Np, the partial gas exchange control explained in FIG. 1 is carried out (Step S8, Step S9), the procedure returns to Step S2, and a similar control is repeated.

As the pulse oscillation number N increases the concentration of fluorine gas in the in the laser gas reduces. Also the concentration of impurities increases, so in order to maintain the output light energy target value Et, the necessary charging voltage is gradually increased. If partial gas exchange is not carried out the charging voltage instruction value V will reach the upper limit value Vmax, at which point a full exchange of the laser gas is carried out. In other words, partial gas exchange is a control that reduces the frequency of full exchange of laser gas by reducing the charging voltage instruction value V by restoring the partial pressure ratio of fluorine gas to the original value before the charging voltage instruction value V increases to reach the upper limit value Vmax, and by discharging part of the impurities in the laser chamber. Nonetheless the impurities are not completely exhausted, so eventually the charging voltage instruction value V will reach the upper limit value Vmax, and a full exchange of laser gas must be carried out.

Next the meaning of the mixing ratios of the gas in the first gas supply source 7 and the second gas supply source 8 is explained. The partial pressure ratio a:b:c within the laser chamber 1 is determined based upon the range for which the laser operates well. Good operation means the output light energy is high (oscillation efficiency is high), variation of output light energy is small, the oscillation spectrum width is narrow for narrow spectrum excimer lasers for semiconductor lithography, and so on.

The partial pressure ratio of the halogen gas, noble gas, and buffer gas in the mixed gas of the first gas supply source 7 is n×a:b:c (n>1). The partial pressure ratio of the noble gas and buffer gas in the mixed gas of the second gas supply source 8 is b:c. Therefore, by replenishing the laser chamber 1 with gas from the two gas supply sources 7, 8 in any proportion, the partial pressure ratio of noble gas and buffer gas in the laser chamber 1 is maintained at b:c. Also, the concentration of fluorine gas in the first gas supply source 7 is n×a (n>1), which is higher than the target value a for partial pressure ratio in the laser chamber 1. Therefore, by adjusting the gas supply ratio from the two gas supply sources 7, 8 it is possible to approach the target value of partial pressure ratio a for fluorine gas in the laser chamber 1. The supply ratio may be obtained by directly measuring the partial pressure ratio of fluorine and determining the deficit, or by determining in advance the correlation between fluorine gas reduction amount and pulse oscillation number N, and obtaining the supply ratio using this correlation.

In the partial gas exchange disclosed in the Japanese Patent No. 2701184, partial gas exchange can be carried out while the laser is operating. Therefore there is no necessity to stop the semiconductor lithography process, and by supplying new gas the frequency of full laser gas exchange can be reduced.

However, in the Japanese Patent No. 2701184 when the charging voltage instruction value V reaches the upper limit value Vmax, a full laser gas exchange is carried out. To fully exchange the laser gas, laser operation is stopped, so for example the semiconductor lithography process is stopped, which has the problem that production throughput is reduced.

SUMMARY OF THE INVENTION

With the foregoing problem point in view, it is an object of the present invention to provide an excimer laser device and method in which the frequency of carrying out a full gas exchange in the laser chamber is reduced and more preferably a full gas exchange becomes unnecessary.

To achieve the above object, a first aspect of the invention is an excimer laser device, which includes a laser chamber in which laser gas is enclosed and impurities increase with passage of time; a gas supply device that supplies laser gas to the laser chamber; a gas exhaust device that exhausts laser gas from the laser chamber; and a controller that controls the gas supply device and the gas exhaust device, wherein the controller controls the gas supply device and the gas exhaust device so as to carry out partial gas exchange of the laser gas in the laser chamber in a gas exchange quantity that maintains a quantity of impurities in the laser chamber at or below a fixed level.

A second aspect of the invention is the device of the first aspect of the invention wherein the controller controls the gas supply device and the gas exhaust device so as to carry out partial gas exchange of the laser gas in the laser chamber in a gas exchange quantity that maintains the quantity of impurities in the laser chamber at an approximately fixed level.

A third aspect of the invention is the device of the first aspect of the invention wherein the controller controls the gas supply device and the gas exhaust device so as to carry out partial gas exchange of the laser gas in the laser chamber in a gas exchange quantity between a gas exchange quantity required to maintain the quantity of impurities in the laser chamber at an approximately fixed level and a gas exchange quantity greater than the gas exchange quantity by 5%.

A fourth aspect of the invention is the device of the first aspect of the invention wherein the controller controls the gas supply device and the gas exhaust device so as to carry out partial gas exchange of the laser gas in the laser chamber in a gas exchange quantity between a gas exchange quantity required to maintain the quantity of impurities in the laser chamber at an approximately fixed level and a gas exchange quantity greater than the gas exchange quantity by 10%.

A fifth aspect of the invention is a laser gas exchange method that partially exchanges laser gas in a laser chamber, comprising the step of: carrying out a partial gas exchange in a gas exchange quantity that maintains a quantity of impurities in the laser chamber at or below a fixed level.

A sixth aspect of the invention is a partial gas exchange quantity calculation method that determines a partial gas exchange quantity that maintains a quantity of impurities in a laser chamber in which laser gas is enclosed and the impurities increase with passage of time, at an approximately fixed level, comprising the step of: determining the partial gas exchange quantity using a total quantity of output light energy reduction (A), a total gas pressure in the laser chamber (P), and an output light energy reduction quantity per unit time (k), for a case where partial gas exchange in the laser chamber is repeated infinitely.

According to aspects 1 through 4 of the invention, the gas supply device and the gas exhaust device are controlled to carry out partial gas exchange in a gas exchange quantity that will maintain the impurities in the laser chamber at or below an approximately constant level. Therefore full gas exchange is unnecessary or the frequency of full gas exchange can be reduced. Therefore for example the production throughput in the process of semiconductor lithography is improved.

According to the fifth aspect of the invention, partial gas exchange is carried out in a gas exchange quantity that will maintain the quantity of impurities in the laser chamber at or below a fixed level. Therefore full laser gas exchange is unnecessary or the frequency of full gas exchange can be reduced. Therefore for example the production throughput in the process of semiconductor lithography is improved.

According to the sixth aspect of the invention, it is possible to carry out partial gas exchange in a partial gas exchange quantity that maintains the quantity of impurities in the laser chamber at a fixed level and that is permitted by the output light energy of the excimer laser device. Therefore, it is possible to maintain the output light energy stable over a long period of time, without carrying out full gas exchange. Also, the quantity of gas exchange can be set to a gas quantity so that the impurities in the laser chamber are maintained approximately constant, so it is possible to reduce the fluctuation in the parameters of the laser light directly after partial gas exchange.

DESCRIPTION OF THE PREFERRED EMBODIMENTS

The following is a detailed description of the preferred embodiments of the present invention, with reference to the drawings.

The amount of increase in impurities in the laser chamber can be estimated to be virtually proportional to the reduction in output light energy. The present application is based on this assumption. Therefore, firstly the results of a quantitative study of how in conventional partial gas exchange impurities vary within the laser chamber, or in other words how output light energy reduces, will be explained.

Figure 1:
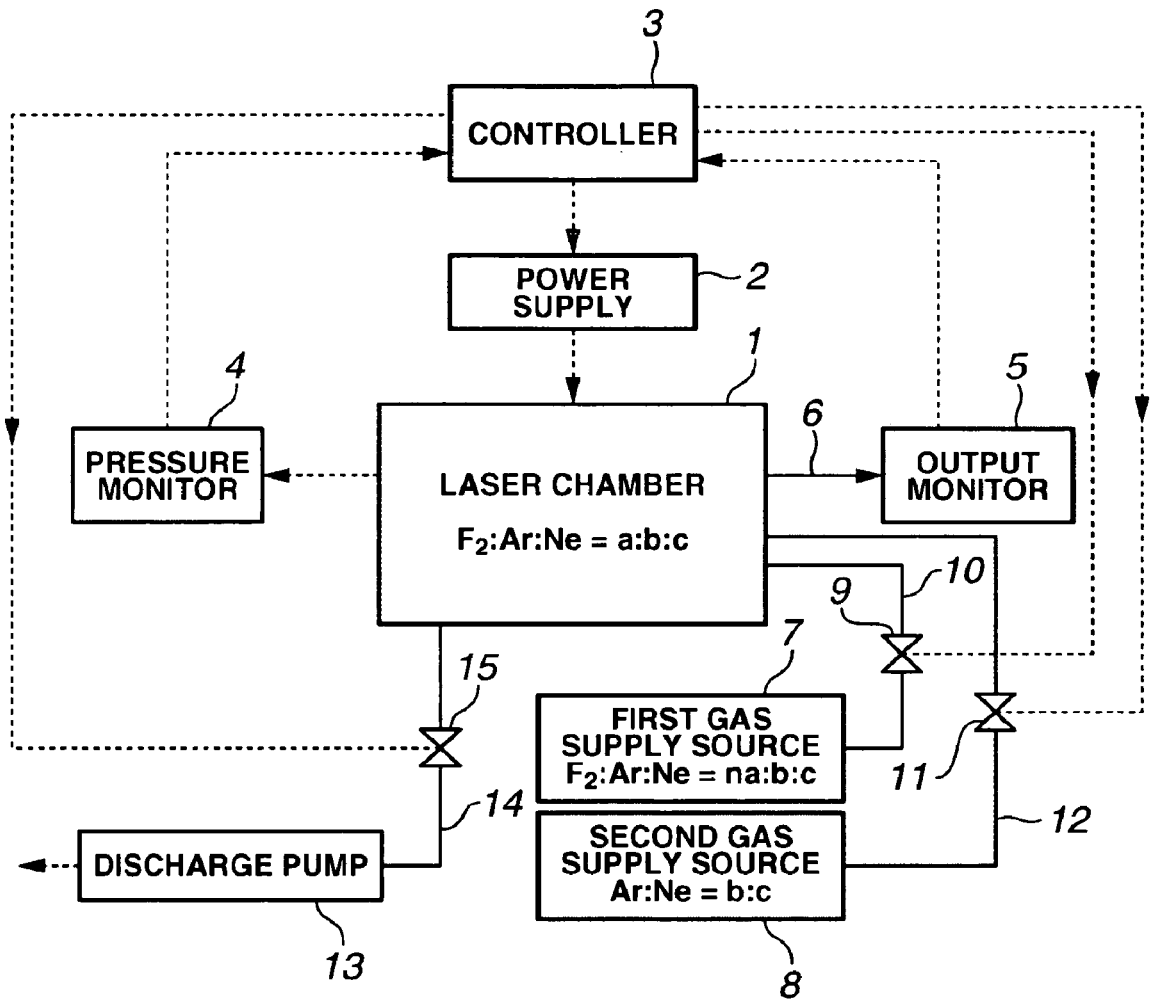
FIG. 1 is an outline diagram showing an excimer laser device to explain the present invention.

The gas control device used in the present application is the conventional device shown in FIG. 1. Also, the partial gas exchange control flow is basically the same as the conventional method shown in FIG. 2. The part that differs from the conventional method is the gas exchange amount $\Delta G$ in the gas replenishment carried out in Step S8 of FIG. 2.

The following is a detailed explanation of the partial gas exchange amount $\Delta G$.

First, the parameters necessary for the explanation are defined.

Ps: Total gas pressure in the laser chamber 1 (Pa)

Pr: Pressure difference between the laser gas total pressure directly after replenishing with laser gas during partial gas exchange and Ps (Pa)

k: Energy reduction coefficient (mJ/hour)

α: Time interval between partial gas exchanges (hours)

Figure 2:
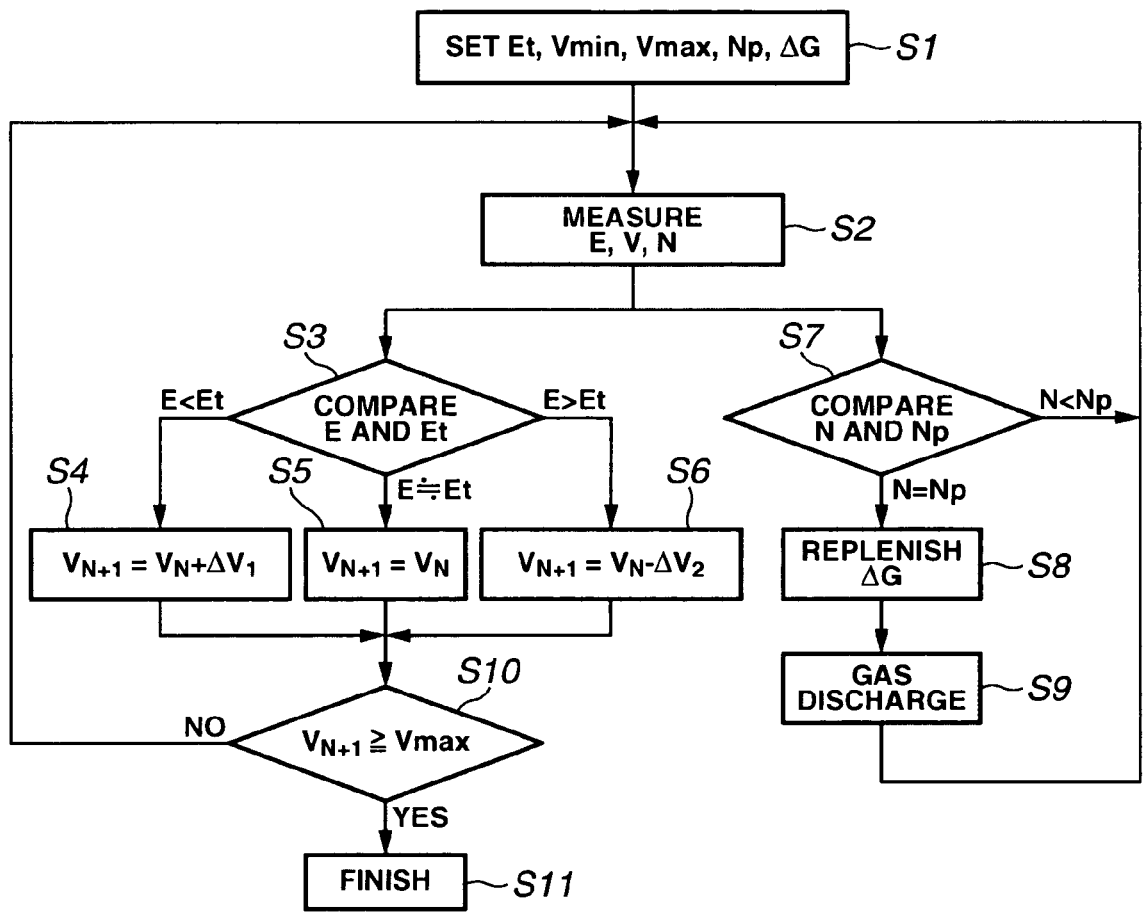
FIG. 2 is a process diagram for a partial gas exchange method to explain the present invention.

In FIG. 2, the charging voltage to maintain the output light energy virtually at the target value Et directly before replenishing with gas in Step S8 is Vinit+$\Delta$V. Assume that at that time if the charging voltage is reduced to Vinit the output light energy would be Et−$\Delta$Egd. In other words, immediately before carrying out the process in Step S8, the output light energy is reduced by $\Delta$Egd due to reduction in the partial pressure of fluorine gas in the laser gas and the increase in impurities.

Due to replenishing with gas in Step S8, the gas pressure in the laser chamber 1 increases from Ps to Ps+Pr. Then due to the partial exhaust of gas in Step S9, the gas pressure in the laser chamber 1 is again restored to the original total gas pressure Ps. Due to the processes in Steps S8 and S9, the quantity of impurities in the laser chamber 1 directly after the gas exhaust process is reduced by the ratio Ps/(Ps+Pr) relative to the quantity of impurities directly before the gas exhaust process. Also, the partial gas exchange is carried out by adjusting the gas supply ratio, so that the partial pressure ratio of the fluorine gas in the laser chamber 1 is near to the target value a.

In this way, by partial gas exchange it is possible to restore the partial pressure of fluorine gas to the original partial pressure a. Hence in the following to simplify the explanation it is assumed that the partial pressure of the fluorine gas does not vary before and after the partial gas exchange (the fluorine gas does not reduce).

It is assumed that after a full gas exchange with new laser gas in the laser chamber 1, when the excimer laser device is operated, and directly before and after partial gas exchange, the charging voltage is Vinit. Also, it is assumed that the output light energy reduction quantity directly before the initial partial gas exchange is $\Delta$E0, and the output light energy reduction quantity directly after the initial partial gas exchange is $\Delta$E1.

As assumed above, the reduction in output light energy is proportional to the quantity of impurities in the laser chamber 1. Therefore the relationship in Equation (1) can be established between these parameters.

$$\Delta E1 = \Delta E0 \times Ps/(Ps+Pr) \tag{1}$$

Here, using parameters defined previously the output light energy reduction quantity $\Delta$E0 up to directly before the initial partial gas exchange can be expressed by Equation (2).

$$\Delta E0 = k \times \alpha \tag{2}$$

Therefore Equation (1) can be transformed into Equation (3).

$$\Delta E1 = k \times \alpha \times Ps/(Ps+Pr) \tag{3}$$

If it is assumed that the rate of increase of impurities in the laser chamber 1 is constant, the output light energy reduction quantity from directly after the first partial gas exchange until directly before the second partial gas exchange can be expressed by Equation (2). Therefore, by adding Equations (2) and (3), the total quantity of output light energy reduction until directly before the second partial gas exchange $\Delta E1'$ is expressed by Equation (4).

$$\Delta E1' = k \times \alpha + k \times \alpha \times Ps/(Ps+Pr) \quad (4)$$
$$= k \times \alpha(1 + Ps/(Ps+Pr))$$

When partial gas exchange is carried out the quantity of impurities in the laser chamber 1 is $(Ps/(Ps+Pr))$ times the quantity before exhaust. Therefore by multiplying Equation (4) by $(Ps/(Ps+Pr))$ the output light energy reduction quantity $\Delta E2$ directly after the second partial gas exchange can be expressed by Equation (5). To simplify the equation, $Ps/(Ps+Pr)=\beta$.

$$\Delta E2 = (k \times \alpha(1 + Ps/(Ps+Pr)) \times Ps/(Ps+Pr)) \quad (5)$$
$$= k \times \alpha \times (\beta + \beta^2)$$

By repeating the calculation in the same way, the total quantity of output light energy reduction directly after the nth partial gas exchange $\Delta En$ can be expressed by Equation (6).

$$\Delta E2 = k \times \alpha \times (\beta + \beta^2 + \beta^3 + \ldots + \beta^n) \quad (6)$$
$$= k \times \alpha \times \beta/(1-\beta) \times (1-\beta^n)$$

Here the total quantity of output light energy reduction after an infinite number of partial gas exchange repetitions is calculated. In Equation (6), placing n equal to infinity ($\infty$) and taking $\Delta E\infty$ to be A, and as $0<\beta<1$, from Equation (6) Equation (7) is obtained.

$$A = k \times \alpha \times \beta/(1-\beta) \quad (7)$$
$$= k \times \alpha \times (Ps/Pr)$$

In other words, by repeated partial gas exchange, the total quantity of output light energy reduction approaches the limiting value A expressed by Equation (7), and does not fall below this value. According to Equation (7), the limiting value A increases in proportion to the time interval between partial gas exchanges $\alpha$, and increases in inverse proportion to the partial gas exchange quantity Pr.

Therefore, when increasing the charging voltage to compensate for the total quantity of output light energy reduction A expressed by Equation (7), if the necessary charging voltage to maintain the output light energy target value Et can be maintained equal to or less than the upper limit to the optimum control charging voltage range Vmax, it is unnecessary to carry out a full exchange of laser gas.

Next, a method of calculating the partial gas exchange quantity so as to make full exchange of the laser gas unnecessary is explained, based upon the above calculation results and study results.

The above partial gas exchange quantity Pr is the gas exchange quantity for constant time intervals $\alpha$ (hour). By obtaining the partial gas exchange quantity per unit time x, the partial gas exchange quantity for a prescribed time interval can be easily obtained. Therefore, the following explanation is based upon the partial gas exchange quantity per unit time x.

The partial gas exchange quantity per unit time x is the value obtained by dividing the partial gas exchange quantity Pr by the time interval $\alpha$, so using Equation (7), $$x = Pr/\alpha \quad (8)$$
$$= k \times Ps/A$$

According to Equation (8), the partial gas exchange quantity per unit time can be obtained from the energy reduction coefficient k and the total quantity of output light energy reduction A. According to Equation (7), the total quantity of output light energy reduction A can be set as an arbitrary value with the time interval $\alpha$ and partial gas exchange quantity Pr as parameters. However, in an actual excimer laser device, the total quantity of output light energy reduction A has an allowable value and cannot be freely set.

In the following, the procedure for obtaining the energy reduction coefficient k and the total quantity of output light energy reduction A is explained.

How to Obtain the Energy Deterioration Coefficient k

Directly after enclosing the laser gas in the laser chamber 1, or directly after a partial gas exchange the laser generates oscillations, and the charging voltage Vs to obtain the output light energy target value Et is recorded. Next, a prescribed period of time dT is left (for example 16 hours) without generating laser oscillations. As time passes impurities from the components in the laser chamber 1 or from the outside air become mixed into the laser gas. After the prescribed period of time dT has passed, the laser generates oscillations, and the output light energy E is measured for the charging voltage Vs, and recorded in memory. Due to the increase in impurities in the laser chamber 1, Et is always greater than E.

Using the values recorded above, the energy deterioration coefficient k can be obtained from Equation (9) as follows.

$$k=(Et-E)/dT \quad (9)$$

[How to Obtain the Allowable Total Quantity of Output Light Energy Reduction A]

To obtain the allowable output light energy reduction A, first the following parameters are defined.

Emax: Maximum output light energy that the excimer laser device can output

Edown: Reduction in output light energy due to causes other than laser gas deterioration (deterioration of optical elements or the narrow bandwidth modules, etc.)

$\pm\Delta e$: Range over which the output light energy target value Et can be varied Here Emax is the value of the light energy that can be output when laser gas is enclosed in the laser chamber 1 at the allowable maximum pressure, and the charging voltage is the allowable maximum value Vmax.

Edown is the reduction in laser oscillation efficiency caused by reduction in light reflectivity or transmissivity due to deterioration of the optical elements. If Edown becomes large, it is necessary to replace the optical elements with new elements.

±Δe is the margin set for the target value Et. The target value Et is not always constant and it is necessary for it to have a certain range of variation. Also in order to make the total light exposure for a prescribed number of pulses constant it is necessary to vary the pulse energy of the individual pulses up and down. Therefore the margins are set.

The remainder after subtracting output light energy reduction component unrelated to gas control (Edown) and the margin (Δe) on the target value Et from the maximum output energy Emax of the excimer laser is the maximum allowable value of the total quantity of output light energy reduction that can be controlled by partial gas exchange control.

The maximum allowable value of the total quantity of output light energy reduction that can be controlled Amax is defined by the following Equation (10).

$$Amax = Emax - Edown - \Delta e \qquad (10)$$

By substituting equations (9) and (10) into Equation (8), the following Equation (11) can be obtained.

$$\begin{aligned} x &= Pr/\alpha \\ &= k \times Ps/Amax \\ &= ((Et-E)/dt) \times Ps/(Emax - Edown - \Delta e) \end{aligned} \qquad (11)$$

If partial gas exchange is carried out based upon Equation (11), the total quantity of output light energy reduction is the allowable value. Therefore, the output light energy can always be controlled to be the target value Et, and full exchange of laser gas can be made unnecessary. Also, even if full exchange of laser gas is required due to laser oscillator errors, etc., it is possible to reduce the frequency of full exchange of laser gas. Also, by using Amax calculated from Equation (10), it is possible to exchange the gas at the lower limit of the partial gas exchange quantity per unit time x, so it is possible to control the fluctuation of parameters directly after partial gas exchange.

When controlling partial gas exchange of an excimer laser device based upon Equation (11), the timing of partial gas exchange is also important. If the condition of the laser gas in the laser chamber 1 is changed rapidly, the central wavelength of the output light or the spectrum width will suddenly change, and the output light energy will suddenly increase. Feedback control will act to suddenly reduce the charging voltage, and this will also contribute to sudden changes in the central wavelength and the spectrum width, which can result in defects.

To avoid these kind of defects, it is desirable to reduce the partial gas exchange quantity per one exchange based upon the partial gas exchange quantity x calculated from Equation (11), and increase the frequency of partial gas exchange.

Figure 3:
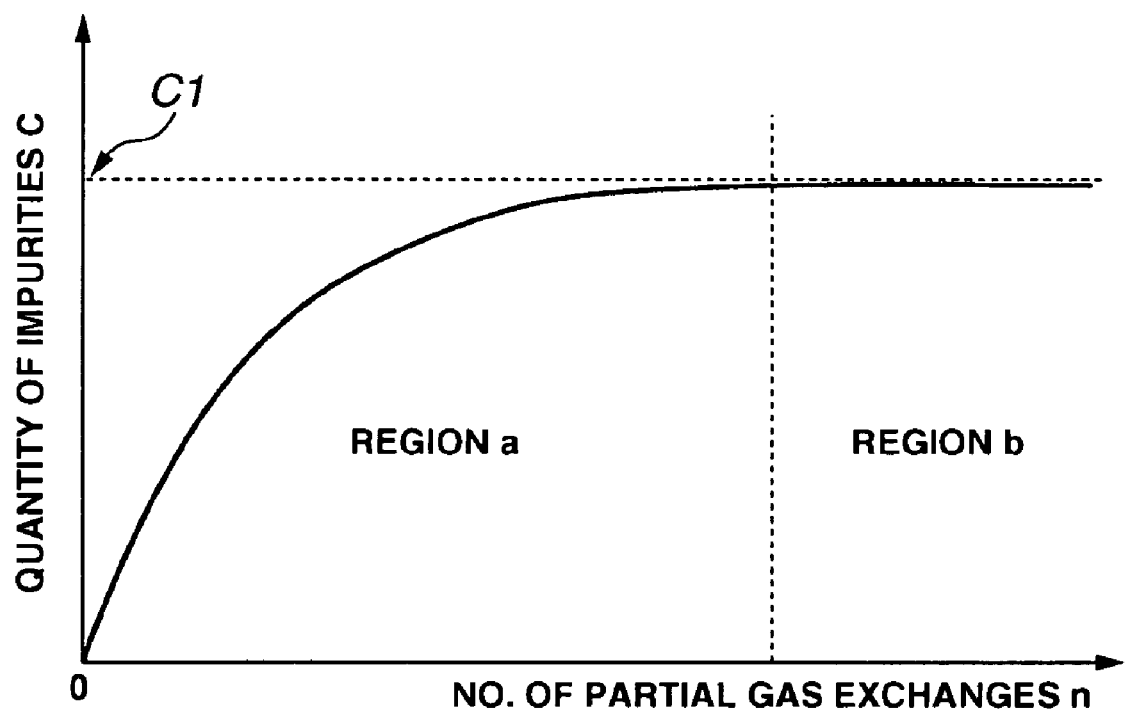
FIG. 3 is a diagram to explain the change in impurities within the laser chamber.

FIG. 3 shows the change in impurities in the laser chamber when partial gas exchange is carried out based upon the partial gas exchange quantity per unit time x. In the figure the small changes that occur before and after partial gas exchange have been averaged out.

In FIG. 3, the horizontal axis is the number of partial gas exchanges n, and the vertical axis is the quantity of impurities C in the laser chamber. When the number of partial gas exchanges is small the increase in impurities in the laser chamber is large, but the amount of increase reduces every time a partial gas exchange n is carried out (region a). After partial gas exchange has been repeated many times, it saturates at a constant level of impurities C1 (region b). Therefore, after partial gas exchange has been repeated many times, the reduction in output light energy is approximately constant corresponding to the quantity of impurities C. Also, because the output light energy is approximately constant the charging voltage value is approximately constant.

In FIG. 3, the quantity of impurities in the laser chamber C becomes the approximately constant value C1 after partial gas exchange has been repeated many times. However, depending upon the circumstances the quantity of impurities C in the laser chamber may be reduced further. This can be done by increasing the partial gas exchange quantity per unit time x. However, increasing the partial gas exchange quantity causes the condition of the laser gas in the laser chamber 1 to change suddenly. Therefore to avoid this it is desirable to carry out partial gas exchange in a gas exchange quantity between a gas exchange quantity that results in an approximately constant level of impurities in the laser chamber and a gas exchange quantity 10% greater than the gas exchange quantity. Also, it is still more desirable to carry out partial gas exchange in a gas exchange quantity between a gas exchange quantity that results in an approximately constant level of impurities in the laser chamber and a gas exchange quantity 5% greater than the gas exchange quantity.

As explained above, according to the excimer laser device of the present invention, it is possible to reduce the frequency of carrying out a full exchange of gas in the laser chamber, and still more preferably to make full gas exchange unnecessary.

Also, by applying the partial gas exchange quantity obtained by the method of the present invention application to partial gas exchange, it is possible to control the output light energy to be the target value Et, without carrying out a full exchange of laser gas.

What is claimed is:

1. An excimer laser device, comprising:
 a laser chamber in which laser gas is enclosed and impurities increase with passage of time;
 a gas supply device that supplies laser gas to the laser chamber;
 a gas exhaust device that exhausts laser gas from the laser chamber; and
 a controller that controls the gas supply device and the gas exhaust device,
 a means for determining a laser gas replenishment quantity using a limiting value of a quantity of output light energy reduction, a total gas pressure in the laser chamber, and an output light energy reduction quantity per unit time when a partial gas exchange is required,
 wherein the controller controls the gas supply device and the gas exhaust device so as to carry out the partial gas exchange of the laser gas in the laser chamber based on the determined laser gas replenishment quantity.

2. The excimer laser device according to claim 1, wherein the controller controls the gas supply device and the gas exhaust device so as to carry out partial gas exchange of the laser gas in the laser chamber in a gas exchange quantity that maintains the quantity of impurities in the laser chamber at an approximately fixed level.

3. The excimer laser device according to claim 1, wherein the controller controls the gas supply device and the gas exhaust device so as to carry out partial gas exchange of the laser gas in the laser chamber in a gas exchange quantity between a gas exchange quantity required to maintain the quantity of impurities in the laser chamber at an approximately fixed level and a gas exchange quantity greater by 5% than the gas exchange quantity required to maintain the quantity of impurities in the laser chamber at the approximately fixed level.

4. The excimer laser device according to claim 1, wherein the controller controls the gas supply device and the gas exhaust device so as to carry out partial gas exchange of the laser gas in the laser chamber in a gas exchange quantity between a gas exchange quantity required to maintain the quantity of impurities in the laser chamber at an approximately fixed level and a gas exchange quantity greater by 10% than the gas exchange quantity required to maintain the quantity of impurities in the laser chamber at the approximately fixed level.

5. A partial gas exchange quantity calculation method that determines a partial gas exchange quantity that maintains a quantity of impurities in a laser chamber in which laser gas is enclosed and the impurities increase with passage of time, at an approximately fixed level, comprising the step of:

determining the partial gas exchange quantity using a limiting value of a quantity of output light energy reduction, a total gas pressure in the laser chamber, and an output light energy reduction quantity per unit time, for a case where partial gas exchange in the laser chamber is repeated.

* * * * *